Aug. 31, 1965  M. C. GILLIS  3,203,351
APPARATUS FOR DISCHARGING LIQUIDS FROM WELLS
Filed Nov. 8, 1962  3 Sheets-Sheet 2

INVENTOR.
MALCOLM C. GILLIS
BY
ATTORNEY

MALCOLM C. GILLIS, INVENTOR.

BY William D. Miller

ATTORNEY

United States Patent Office 3,203,351
Patented Aug. 31, 1965

3,203,351
APPARATUS FOR DISCHARGING LIQUIDS FROM WELLS
Malcolm C. Gillis, Oklahoma City, Okla., assignor to Pan American Petroleum Corporation, Tulsa, Okla., a corporation of Delaware
Filed Nov. 8, 1962, Ser. No. 236,773
6 Claims. (Cl. 103—46)

This application is a continuation-in-part of my copending application Serial Number 132,612, filed August 21, 1961 now abandoned.

This invention relates to apparatus for the automatic removal of liquids from a well. More particularly, it concerns equipment which senses the accumulation of a designated quantity of liquid in a gas well then operates to expel that liquid, utilizing the high-pressure gas in the well as the lifting energy.

Many gas wells produce a small quantity of liquid, usually water. Some of the wells having this producing characteristic do not have a flowing pressure great enough to displace a several hundred foot column of accumulated well liquids. Gas lift methods have been used to remove these liquids; however, continuous gas lift is inefficient at the low rates of liquid production. Also, periodic attention is required to maintain intermittent gas lift equipment. The clocks on the intermitters must be wound and the frequency of the lift cycles must be adjusted in accordance with gas withdrawal rate if optimum lifting efficiency is to be maintained. Many gas fields are developed on a 640-acre spacing, consequently it is not economical to maintain all-weather lease roads. Owing to this combination of wide well spacing and poor access, the frequent attention necessary for efficient operation of gas lift equipment is sometimes impractical.

Many of the wells produce as little as one to ten barrels per day of liquids, including water. If the liquid is allowed to accumulate in the well, the hydrostatic head might become too great for the available gas pressure to lift the column of liquid. This will enable water to invade the gas-producing zone, causing a substantial loss of gas permeability.

It is therefore an object of my invention to provide apparatus to remove water and other liquids from a well without using excessive volumes of gas. It is also an object to remove such liquids when a designated quantity has accumulated in the well. Another object is to perform the removal automatically, without routine servicing of the equipment. A further object is to provide apparatus which can be operated by energy in the well fluid, eliminating the need for an outside power supply. Another object is to provide a convenient means for adjusting the period of the operating cycle to obtain optimum operating efficiency.

The method whereby these and other objects are accomplished will be apparent from the following description of my invention.

Figure 1:
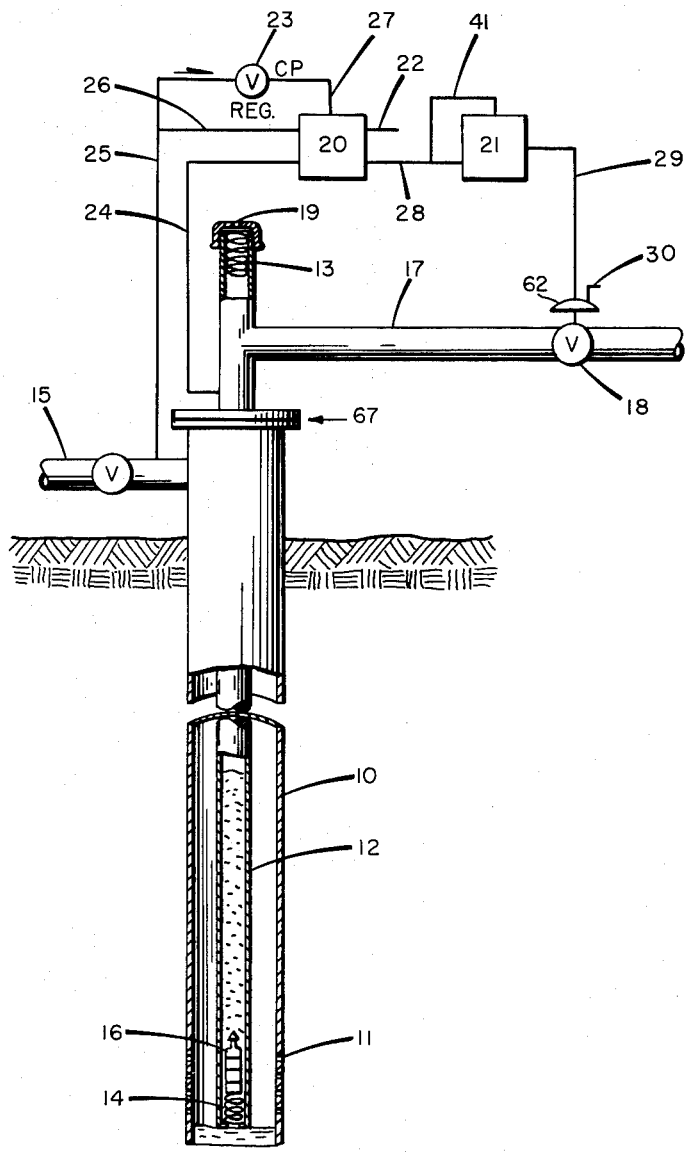
FIGURE 1 shows the general arrangement of this equipment in relation to the well.

Referring to FIGURE 1, the well has casing 10 with perforations 11 which admit gas and liquids from the formation. Gas produced by the well is withdrawn through flow line 15. Tubing 12 supported in well head 67 extends down the well to a point where the liquids accumulate near the bottom of the well. An inlet is provided in the tubing 12 near the bottom of the well. Inside the tubing, plunger 16 is provided to oscillate in the tubing between upper and lower bumpers 13 and 14 as liquids are lifted to the surface and discharged through tubing outlet 17. Gas is released through vent 19 in the tubing head as gas and liquids enter the lower end of the tubing. The decrease in the gas pressure at the tubing head owing to the increase in the height of the liquid column in the tubing is monitored by differential pressure element 20. The pressures at the tubing head and casing are transmitted to element 20 by impulse lines 24 and 26. Gas is withdrawn from the casing through flowline 15 and line 25 for use in operating the pneumatic flow control apparatus. The pressure of the operating gas is kept constant by pressure regulator 23. Differential pressure element 20 admits operating gas to line 28 when a preset pressure differential is reached. The operating gas passes through block valve 21 to pneumatic valve motor 62, opening unloading valve 18 in the tubing outlet. Operating gas is also admitted to a timing device in the block valve by way of line 41 to close the block valve after valve 18 has been open for a length of time sufficient for plunger 16 to reach the tubing head.

Figure 2:
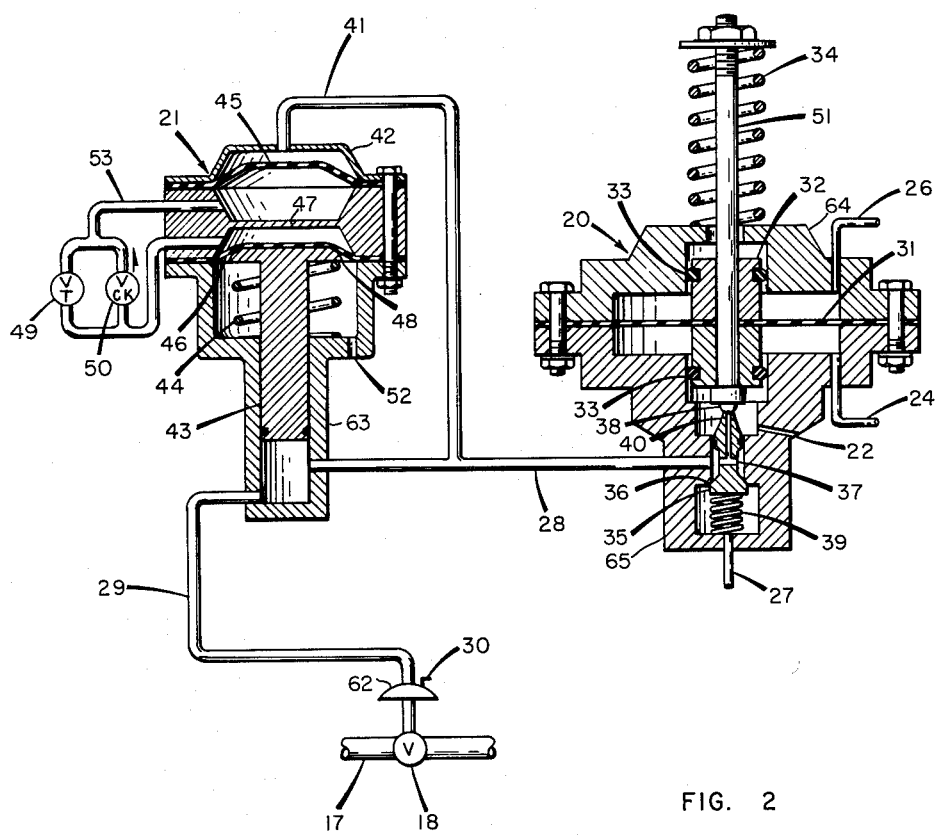
FIGURE 2 shows the structure of the control valves used in the automatic operation of the well.

The details of the flow control instruments are shown in FIGURE 2. Differential pressure element 20 receives pressure impulse lines 24 and 26 at opposite sides of flexible diaphragm 31. Piston 32 and O-rings 33 provide gas-tight chambers between housing 64 and valve body 65 of the differential pressure element and the diaphragm. Valve member 35 is held against valve seat 36 by spring 39 and the pressure of the supply gas below the valve member when diaphragm 31 is in its upper position. Valve member 38 closes gas passageway 37 and valve member 35 moves off valve seat 36 when the diaphragm is in its lower position. Operating gas in the block valve timing device vents through lines 41 and 28, gas passageway 37 and vent 22 when high tubing pressure on the lower surface of diaphragm 31 lifts valve member 38 off the outlet to passageway 37.

Operating gas passing through valve seat 36 enters line 28. A portion of the gas goes to the block-valve timing device by way of line 41. The remainder goes to block valve body 63. Spring 44 urges valve member 43 to a normally open position, thereby conducting operating gas to valve motor 62 by way of line 29. The timing device in block valve 21 includes upper and lower flexible diaphragms 45 and 46, respectively, separated by plate 47 and enclosed by housing 42 above and by valve body 63 below. Operating gas from line 28 flows through line 41 to the upper chamber between housing 42 and upper diaphragm 45 to operate the timing device. Bearing plate 48 on the upper end of valve member 43 transmits the pressure of spring 44 to lower diaphragm 46. The chambers between the diaphragms and plate 47 are in fluid communication by way of fluid conduit 53, including throttle or needle valve 49 and check valve 50.

Figure 3:
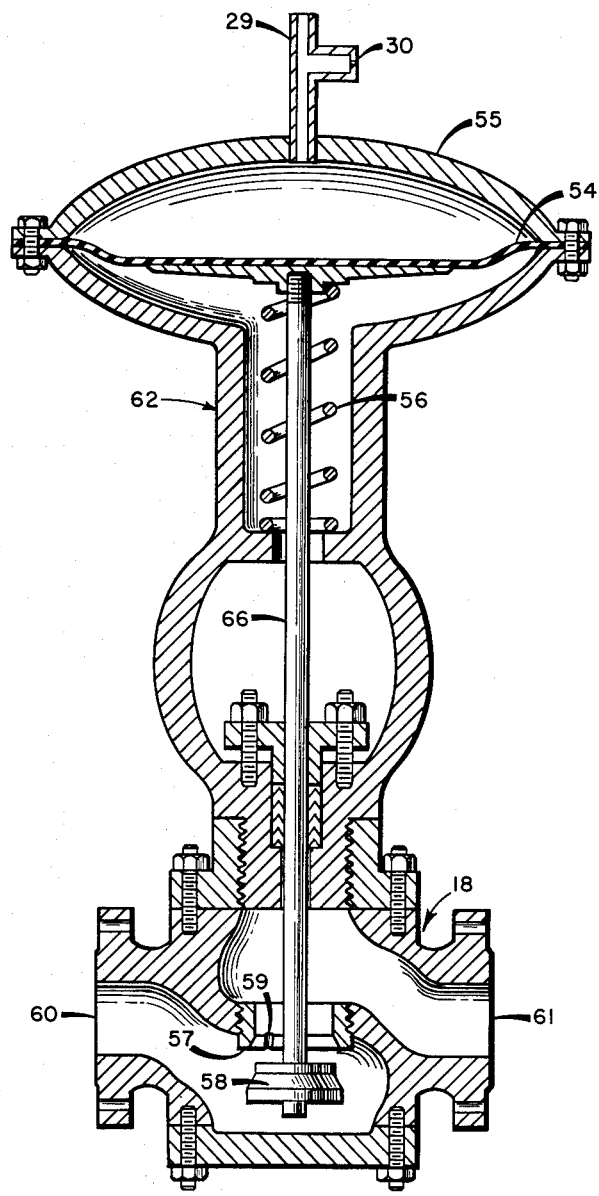
FIGURE 3 shows an unloading valve operated by pneumatic means which may be used in accordance with my invention.

Valve motor 62 and valve 18 shown in cross-section in FIGURE 3 is the type commonly referred to as a pressure-opening valve. Spring 56 applies an upward force on valve member 58 attached to valve stem 66, holding the valve member against valve seat 57, thereby preventing flow through the valve between inlet and outlet ports 60 and 61, respectively. The valve is opened by admitting operating gas via line 29 to the chamber between motor housing 55 and flexible diaphragm 54 until the pressure of the gas above the diaphragm is sufficient to overcome the counter-acting force of spring 56. When the flow of operating gas is discontinued, the gas above the diaphragm exhausts through vent 30, enabling spring 56 to close the valve. Vent 30 is open continuously; however, gas flows through line 29 faster than it exhausts through vent 30 when the block valve is open.

Gas entering the tubing as the liquid enters may be vented through notch 59 in seat 57 of valve 18 rather than through a vent in the tubing head. A vent in the tubing head as shown at 19 may become plugged with salt crystals, pipe scale, sand and the like. A small notch in either seat 57 or valve member 58 of the unloading valve provides a self-cleaning vent. The surge of fluids over the notch when the valve is open scours away any solids which might plug the vent.

In actual operation of the apparatus of my invention, a mixture of gas and liquid enters casing 10 through perforations 11. The liquid, which may be either water or hydrocarbons as well as a mixture of both, settles at the bottom of the well. Gas is withdrawn from the annulus through flow line 15 for use or sale as natural gas. Vent 19 at the tubing head provides a small flow of gas to reduce the pressure in tubing 12 whereby the liquid at the bottom of the well can be displaced into the tubing by the greater gas pressure in the annulus between the tubing and casing. As the height of the liquid column in the tubing increases, the pressure of the gas at the tubing head decreases, owing to the greater resistance to gas entering the tubing. The flow capacity of vent 19 is adjusted so that the volume of gas vented during a given time is approximately equal to the volume of liquid entering the well.

Differential pressure element 20, shown in detail in FIGURE 2, receives pressure impulses from the casing and tubing head through lines 26 and 24, respectively. As the height of the liquid column in the tubing increases and the gas pressure above the liquid decreases, the casing pressure acting on the top surface of flexible diaphragm 31 overcomes the combined force of spring 34 and the tubing pressure on the lower surface of the diaphragm. The diaphragm moves down and rod 51 including valve member 38 on the lower end, moves into engagement with valve seat 40, closing gas passageway 37. Further movement of the diaphragm displaces valve member 35 downward against spring 39, clearing valve seat 36 whereby operating gas entering valve body 65 at line 27 flows into line 28. The amount of loading on the diaphragm by spring 34 can be adjusted so that valve member 35 will be moved owing to the differential pressure across diaphragm 31 to admit supply gas when the desired quantity of liquid has accumulated in the tubing.

Gas flowing through valve seat 36 to line 28 passes through block valve 21 while valve member 43 is held open by spring 44. From the block valve, the gas is conducted to valve motor 62 by way of line 29. The motor opens valve 18 in conduit 17, discharging fluids in the tubing to atmospheric pressure. The rapid release of gas pressure from the tubing when valve 18 is open enables gas from the well annulus to enter the tubing at a rate sufficient to lift plunger 16 and the column of liquid above it to the surface. The liquid in tubing outlet 17 is discharged to a sump, tank or other receiver maintained at substantially atmospheric pressure. Upper bumper 13 decelerates the plunger at the top of its travel.

At the same time that operating gas passes to valve motor 62, a portion of the gas passes through line 41 to the timing mechanism in the upper part of block valve 21. The gas enters the operating gas chamber between housing 42 and upper diaphragm 45. The pressure of the gas is transmitted across the diaphragm to the upper fluid chamber between the upper diaphragm and plate 47. Fluid flows from this chamber to the lower fluid chamber between plate 47 and lower diaphragm 46 by way of conduit 53 and throttle valve 49. The flow of fluid into the lower chamber moves the lower diaphragm and bearing plate 48 downward, carrying block valve member 43 down and compressing spring 44. Throttle valve 49 is adjusted so that the time required for fluid to flow around plate 47 and move valve member 43 in valve body 63 and close the flow of operating gas to valve motor 62 is sufficient for plunger 16 and the column of liquid above it to reach the surface. The chambers between the flexible diaphragms and plate 47 are preferably filled with a liquid which exhibits substantially constant flow properties over the range of temperatures which are likely to exist during the operation of the apparatus. Suitable liquids for this purpose include low molecular weight alcohols, kerosene and mercury. A liquid is preferred over a gas for the reason that larger throttle valve openings may be used with liquid for a given volume of the fluid. A single diaphragm motor can be used to actuate valve member 43 if the needle valve is placed in line 41. This arrangement is less desirable because it is less adaptable to the use of a liquid in the timing mechanism.

When block valve member 43 moves down in valve body 63, the flow of operating gas through line 29 to valve motor 62 is shut off. Valve 18 closes when gas which has been holding it open exhausts through vent 30. With valve 18 closed, the pressure in tubing 12 increases as gas enters tubing 12 from the annulus. The resulting increase in pressure below flexible diaphragm 31 in differential pressure element 20 enables spring 34 to raise the diaphragm and rod 51. Spring 39 raises valve member 35 until it engages valve seat 36, cutting off the supply of operating gas from line 27 to line 28. With flow through outlet 17 and tubing 12 stopped, plunger 16 can fall through the tubing to its starting position above the lower bumper. A further rise in rod 51 lifts valve member 38 off seat 40, exhausting the gas in lines 28 and 41, as well as that in the chamber above upper diaphragm 45, through gas passageway 37 and vent 22. The reduction in pressure above diaphragm 45 permits fluid below plate 47 to return to the chamber above the plate owing to pressure of spring 44 transmitted through bearing plate 48 to diaphragm 46. Check valve 50 in parallel flow with throttle valve 49 may be used to permit a rapid reverse flow through conduit 53. Vent 52 in the block valve housing prevents changes in pressure below the lower diaphragm as it moves up and down in valve body 63.

Block valve member 43 rapidly returns to the open position, providing fluid communication between operating gas line 28 and valve motor 62. Thus, the block valve is reset for another lift cycle which will start automatically when the pressure differential between the tubing and casing becomes great enough to move valve member 35 off seat 36.

FIGURE 1 shows a regulator valve 23 in operating gas line 25. This valve provides a continuous supply of gas at constant pressure to operate the block and motor valve in the system, thereby avoiding the need for an external source of energy to operate the apparatus.

A specific embodiment of my invention has been described; however, it should be understood that alternative mechanical devices for elements of this assembly will be apparent to those skilled in the art. For instance, the liquid may be blown from the well without using a plunger; however, less slippage of the gas through the liquid is likely if a solid interface is provided between the liquid and the lift gas. Also, the apparatus can be used for intermittent gas lifting of oil from a well producing too little gas to lift the produced liquids. In that situation, line 15 would be connected to a source of lift gas.

In place of differential pressure element 20, I may use a device which operates independently of the casing pressure. A prepressured bellows or a spring-loaded diaphragm can be arranged to hold valve member 35 against seat 36 until tubing pressure declines to a preset level.

What I wish to claim as my invention is set out in the following claims.

I claim:

1. An apparatus for removing liquid from a well through a tubing suspended therein, said tubing having an inlet near the bottom of said well and an outlet at the head of said tubing, the combination comprising:

a vent in said tubing near said outlet,
    a valve in said tubing outlet,
    a gas-operated valve motor for controlling said valve in said tubing outlet, means for supplying operating gas to said valve motor in response to the pressure drop in said tubing as a liquid column accumulates in said tubing while gas exhausts through said vent, said means including a differential pressure responsive valve and two pressure lines leading to said differential pressure responsive valve, one line leading from the inside of the well tubing and the other leading from the well outside said tubing, a block valve arranged to control the supply of operating gas from said means to said valve motor, a timing device in operative connection with said block valve, said timing device including a housing with a partition therein forming a pair of chambers, a fluid conduit between said chambers, a throttle valve in said fluid conduit, means to admit operating gas to said timing device whereby a fluid in one of said chambers is displaced through said throttle valve into the other of said chambers, the other of said chambers being an expansible chamber operatively connected to said block valve whereby the transfer of fluid to said other chamber closes said block valve, and means to exhaust operating gas from said valve motor.

2. An apparatus for removing liquid from a well having a well head with a gas conduit and a liquid conduit extending therebelow, the combination comprising:

a throttled vent in said liquid conduit near said well head, an unloading valve in said liquid conduit above said well head, pneumatic means for opening and closing said unloading valve, a differential pressure responsive valve adapted to admit operating gas to said pneumatic means when the pressure drop between said gas and liquid conduits reaches a preset value as a liquid column accumulates in said liquid conduit and as gas exhausts through said throttled vent, two pressure lines leading to said differential pressure responsive valve, one line leading from the inside of the well tubing and the other leading from the well outside said tubing, a block valve between said pneumatic means and said differential pressure responsive valve, means to close said block valve a preset length of time after said differential pressure responsive valve opens, said block valve closing means including a housing, a partition forming two chambers therein, a conduit between said chambers, a throttle valve in said conduit, and means to admit operating gas to one of said chambers, the other of said chambers being an expansible chamber in operative engagement with said block valve whereby operating gas entering one of said chambers flows through said conduit and throttle valve into the other of said chambers and closes said block valve, and means to vent operating gas from said pneumatic means when said block valve is closed.

3. The apparatus of claim 1 wherein said tubing vent has a volumetric gas flow capacity approximately equal to the volumetric rate of liquid flow into said well.

4. The apparatus of claim 1 wherein said tubing outlet valve includes a valve seat and a valve member adapted to close said valve seat, and said tubing vent comprises a notch in at least one of said valve seat and valve member.

5. The apparatus of claim 1 including a check valve in said fluid conduit in said timing device, said check valve being positioned in parallel flow arrangement with said throttle valve whereby fluid in said other chamber can flow through said check valve to said one chamber.

6. An apparatus for removing liquid from a well having a well head with a gas conduit and a liquid conduit extending therebelow, the combination comprising:

an unloading valve in said liquid conduit above said well head, said valve having a seat and a member adapted for movement in relation to said seat to control flow through said valve, a notch in at least one of said valve seat and valve member providing a continuous vent through said valve, a pneumatic valve motor in operative connection with said unloading valve, said motor being adapted to open said valve when operating gas is supplied to said motor, a differential pressure responsive valve arranged to admit operating gas to said valve motor when the pressure drop between said gas and liquid conduits near said well head reaches a preset value as a liquid column accumulates in said liquid conduit and gas vents through said notch, two pressure lines leading to said differential pressure responsive valve, one line leading from the inside of the well tubing and the other leading from the well outside said tubing, an operating gas conduit connecting said valve motor with said differential pressure responsive valve, a block valve in said operating gas conduit, means to close said block valve a preset length of time after said differential pressure responsive valve opens, said block valve closing means including a housing, a partition in said housing forming a pair of chambers therein, a conduit between said chambers, a throttle valve and a check valve in parallel flow relationship in said conduit, means to admit gas from said operating gas conduit to one of said chambers, displacing fluid therein through said throttle valve and into the other of said chambers, said check valve being arranged to permit flow therethrough only from said other chamber to said one chamber, said other chamber being an expansible chamber in operative communication with said block valve whereby said block valve is closed when a fixed volume of fluid has been displaced into said other chamber, and a vent in said pneumatic valve motor adapted to exhaust said operating gas from said motor when said block valve is closed, thereby closing said unloading valve.

References Cited by the Examiner

UNITED STATES PATENTS

| | | | |
|---|---|---|---|
| 1,856,872 | 5/32 | Kogan | 166—53 X |
| 2,251,244 | 7/41 | Stanley | 166—45 |
| 2,789,645 | 4/57 | Curnutt et al. | 166—45 X |
| 3,053,188 | 9/62 | Dinning et al. | 103—52 |

LAURENCE V. EFNER, *Primary Examiner.*

BENJAMIN HERSCH, *Examiner.*